INVENTOR.
WILLIAM MIEHLE
BY George Baron
ATTORNEY 2,920,314
Patented Jan. 5, 1960

2,920,314

INPUT DEVICE FOR APPLYING ASYNCHRONOUSLY TIMED DATA SIGNALS TO A SYNCHRONOUS SYSTEM

William Miehle, Havertown, Pa., assignor to Burroughs Corporation, Detroit, Mich., a corporation of Michigan Application January 30, 1956, Serial No. 562,259

10 Claims. (Cl. 340—174)

This invention relates in general to magnetic memory circuits and apparatus using magnetic binaries, but more particularly to magnetic shift registers or logic solving networks employing bistable magnetic cores.

In electronic computing systems or logic solving networks, a shift register is employed to store information in binary form in magnetic cores that comprise such shift register. Operations are performed on such magnetic cores in accordance with instructions read into the computer or logic solving network. The magnetic binaries as used herein are described in an article entitled "Static Magnetic Storage and Delay Line" by An Wang and Way Dong Woo and published in January 1950 issue of the "Journal of Applied Physics."

A magnetic binary core in a magnetic binary circuit is capable of being magnetized to saturation in either of two directions. After such magnetization, the remanent flux in the core has the maximum possible value in either direction, and this maximum value is referred to as the retentivity of the core. Ordinarily the magnitude of retentivity is the same in either direction. The following convention is used to assign algebraic signs and information content to the directions. Two states are said to arise from the two directions: a positive or active state in which the direction of retentivity is opposite to that which would result from the application of a sensing or shift pulse to a shift winding on the core; a negative, or inactive, state in which the direction of retentivity is the same as that which would result from the application of a shift pulse to a shift winding. When applied to a core in the active state, a shift current causes the inactive state to appear. When applied to a core already in the inactive state, a shift pulse causes no change in state.

A current pulse applied to a winding in such a manner as to create a magnetomotive force opposite in direction to that created by the shift pulse will cause the active state to appear, or, if already present, to be maintained. Because of the property of saturation displayed by the cores, the two states are stable and reproducible.

In digital work the convention further signifies that a core in the active, or positive, state may be said to contain or store a binary digit "one," and that a core in the negative, or inactive, state be said to contain the digit "zero." Thus the quantity stored in the representation of digital information is residual magnetic flux. Each core can store but one digit, and the action of the shift pulse is always to create or maintain the "zero" condition.

In carrying out the storage and shifting of such binary information in one particular example of a magnetic shift register or the like, one utilizes, as is set out in the aforementioned article by Wang and Woo, a first array of cores which receives information in binary form. At some time period after the receipt of such information, a first shifting pulse is applied to a winding associated with all the cores in the first array so as to switch the cores to their "zero" states. Output windings are coupled to every core in the first array. A second array of cores, called delay or idler cores, are each interspersed between the cores of the first array and have their input windings joined to the output windings on the first array of cores so that all the "ones" in the first array of cores will be transferred to the corresponding cores in the second array of delay cores. The delay cores store or retain such information transferred to them by the first shifting pulse when the cores in the first array of cores are switched to their zero states. At a time period after the appearance of the first shifting pulse, a second shifting pulse is applied to a winding coupled to all the cores of the array of delay cores so as to switch all such cores to their "zero" states. The delay cores have output windings thereon which are joined to input windings on adjacent cores of the first array of cores. Thus the "ones" that were stored in the delay cores have now been shifted forward to a new core of the first array of cores. Thus, the shift has taken place so that a "one" stored in a given core of the first array has, by the employment of two separate shifting pulses, been shifted to its next successive core of that first array. Consequently the magnetic shift register, after such alternate repeated switchings of the first array of cores and second array of cores, can transfer information put into the first core of an array of cores to any subsequent core of such array.

It is necessary, in the operation of a magnetic shift register of either the type described or of a single core per bit type, to prevent the occurrence of the input of information into a core with the occurrence of the shifting pulse that will read out such information. In present day shift registers or the like, since input signals into a core tend to store a "one" in said core and shifting pulses applied to a core switch such core to its "zero" state, the coincident presence of an input pulse and a shift pulse to the input and shifting winding, respectively, of such a core will nullify the input pulse. As a consequence, the input pulse, representing information which the computer or logic solving machine must operate upon, will be lost due to such coincidence. Such lost information will entail obvious inaccuracies in the final result obtained by the computing machine.

The instant invention utilizes two cores in a novel manner so that the information represented by an input pulse will be preserved in one or the other core regardless of the coincidence of said input pulse with a shifting pulse. Such preservation permits a subsequent shifting pulse to produce an output pulse in the output circuit of such two cores.

It is an object of the instant invention to improve the reliability of operation of magnetic shift registers and the like.

It is another object to preserve the input of a signal pulse into a core of a magnetic shift register even if such signal pulse occurs coincidentally with the application of a shifting pulse to said core.

It is yet another object to standardize the input signal to a core of a shift register with respect to time even when arriving at a random time during an input period so that the input signals to such cores are synchronized with the operation of the shift register and do not occur coincidently with shift pulses.

The invention will now be described with reference to the drawing of which:

Figure 3:
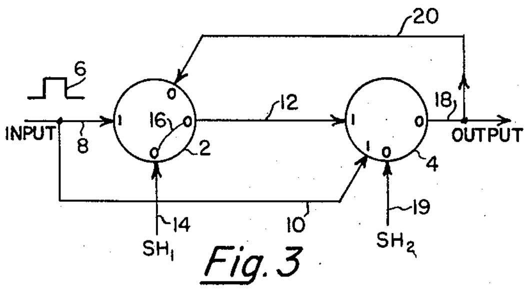
Figure 3 is a representation of Figure 1 in symbolic logic notation.

In Figure 3, circles 2 and 4 represent two binary magnetic cores that are employed in the input circuit of a magnetic shift register or a logic-solving circuit. Information in the form of an input signal pulse 6 enters input windings indicated by arrow heads associated with such cores through input leads 8 and 10 so as to store a "one" in each core 2 and 4. Line 12 represents a transfer loop coupling the cores 2 and 4 and the arrow on said line 12, like all the arrows in Figure 3, represents the direction in which information, in the form of signal pulses, is transmitted. The arrows touch the circumference of a core and the "0" or "1" appearing at the tip of such arrows indicate the binary state in which the core is set when current pulses effectively switch such core with a signal pulse affecting the core from an input winding represented by the arrow.

The application of a shifting pulse $SH_1$, through lead 14, indicates that such shifting pulse will switch core 2 to its "0" state. The "eyebrow" 16 coupling the input lead 14 and output lead 12 of core 2 symbolically illustrates a conditional transfer operation such that an output is produced in lead 12 only when core 2 is switched to its "0" state through the application of a shifting pulse $SH_1$. Core 4 lacks the "eyebrow" notation so that an output signal pulse appears in lead 18 whenever the core 4 is shifted to its "0" state. Normally core 4 will be switched to its "0" state by the application of a shifting pulse $SH_2$ through lead 19. It is noted that part of the output energy from core 4 is fed back through lead 20 to set core 2 to its "0" state.

Figure 5:
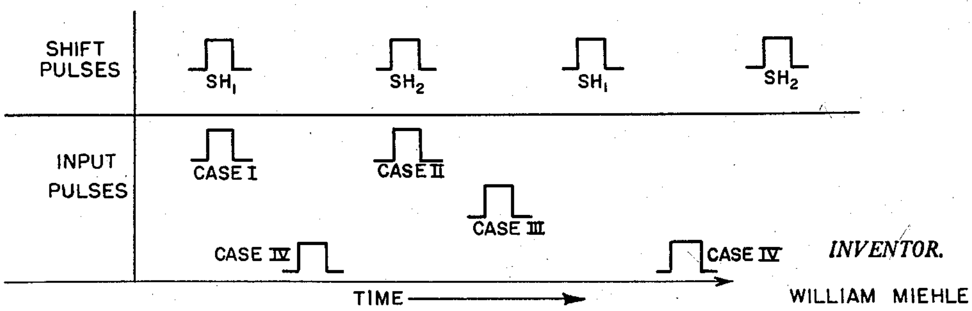
Figure 5 is a pulse-time diagram of the various input pulses and shifting pulses that are applied to the cores of Figures 1 and 2.

The waveforms of Figure 5 are referred to in conjunction with Figure 3 to describe the overall operation of an embodiment of the invention. Since a signal pulse tending to set a core to its "1" state would be nullified if it were to arrive at the core at the same time that a shift pulse arrived at said core, means must be supplied to preserve such signal pulse despite coincidence, so that the computer or logic solving machine will not be operating on false information. Such preservation is obtained in the following manner: Case I occurs where the input pulse 6 arrives at core 2 at the same time as an overriding shifting pulse $SH_1$. In this instance, assuming that cores 2 and 4 are in their "0" states to begin with, core 2 will remain in its "0" state since the $SH_1$ pulse nullifies the input pulse 6. However lead 10 carries the effect of input pulse 6 to core 4 so as to store a "1" in core 4. Incidentally, were core 2 in its "1" state when a $SH_1$ pulse had arrived coincidentally with input pulse 6, the magnetic flux produced by shifting pulse $SH_1$ could be made large enough to not only transfer the "1" in core 2 to core 4, but also to nullify the "1" being read into core 2. In such case, the arrival of input pulse 6 along lead 10 would read a "1" into core 4 which already is in a "1" state, leaving core 4 in its desired state. Consequently input pulse 6 is preserved when it arrives coincidentally with shifting pulse $SH_1$ regardless of the state of core 2. Now when shifting pulse $SH_2$, appearing at a time later than $SH_1$, is applied to core 4, the "1" is read out of core 4 and is utilized in an output circuit along lead 18. Part of the output energy appearing along lead 18 is fed back by lead 20 into core 2 to assure the switching of core 2 to its "0" state, so that shifting pulse $SH_2$ serves to reset both cores 2 and 4 to zero to await for the input signals under conditions hereinafter explained. Thus, the circuit of Figure 3 preserves an input signal under the conditions of Case I.

Case II occurs when the input pulse 6 arrives coincidentally with an overriding shifting pulse $SH_2$. Core 4, being initially in its "0" reset state, will remain in its "0" state because the shifting pulse $SH_2$ will nullify the input signal 6 that has been carried by lead 10. However, the input pulse 6 will store a "1" in core 2. Now, when the next shifting pulse $SH_1$ arrives, the "1" stored in core 2 is transferred via the transfer circuit represented by lead 12 to core 4. The next overriding shifting pulse $SH_2$ will switch core 4 to its "0" state to produce an output pulse as well as to maintain core 2 in its "0" state.

It is understood that $SH_1$ and $SH_2$ are clock pulses which appear cyclically and in alternation so that core 4 is cleared to its "0" state by a $SH_2$ pulse at a predetermined time after core 2 has been cleared to its "0" state by a $SH_1$ pulse. After the termination of $SH_2$ pulse the read-in cycle begins again and information is read into core 2 to be followed by a shifting pulse $SH_1$ to core 2 which in turn is followed by the application of a shifting pulse $SH_2$ to core 4. For the logical circuit of Figure 3 to operate, it is also assumed that the duration of the input pulse 6 is less than the interval between shifting pulses $SH_1$ and $SH_2$. Such an assumption is well within the operating conditions of a magnetic shift register or logic-solving machine.

Case III applies when an input pulse 6 arrives after a $SH_2$ pulse but before the subsequent $SH_1$ pulse. There is no problem in Case III because the input pulse 6 sets both cores 2 and 4 to their "1" states. The arrival of a $SH_1$ pulse sets core 2 to its "0" state and tends to transfer the "1" in core 2 to core 4, but since core 4 is already in its "1" state, the transfer of the "1" is ineffectual. The arrival of a $SH_2$ pulse will produce the required output from core 4 and feedback to core 2.

Case IV applies when an input pulse arrives at a time between $SH_1$ and $SH_2$ pulses. Both cores are put into their "1" states. The $SH_2$ pulse obtains the necessary output through lead 18 and also resets core 2 through lead 20 to its "0" state. This resetting of core 2 in Case IV prevents the initial input pulse from being read out twice, and assures operation during a single $SH_1$, $SH_2$ cycle in every case.

Figure 1:
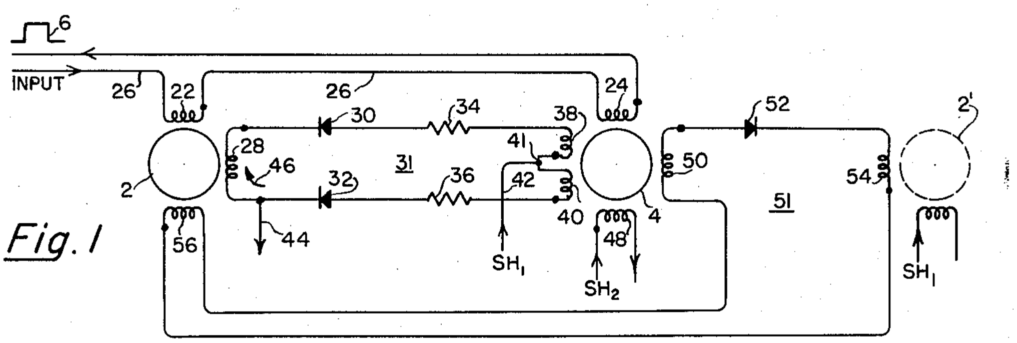
Figure 1 is an electrical schematic of an embodiment of the invention.

The logical circuit of Figure 3 is realized by the electrical circuit shown schematically in Figure 1 wherein is shown the two binary magnetic cores 2 and 4. Input pulse 6 is applied to windings 22 and 24 along conductor 26 to produce current flow in the direction of the arrows shown on conductor 26 so that a current pulse is transmitted through the undotted terminals of windings 22 and 24, respectively Such current pulses will switch cores 2 and 4 to their respective "1" states unless such cores are already in their "1" states, or if a shifting pulse should coincide with such current pulses, said shifting pulses being designed to override the effect of the input pulses 6.

The conditional transfer circuit shown symbolically in Figure 3 as the "eyebrow" 16 and lead 12 is shown in Figure 1 as comprising an output winding 28 on core 2, a pair of diodes 30 and 32, current limiting resistors 34 and 36, and a split input winding on core 4 comprising an upper branch 38 and a lower branch 40. The diodes 30 and 32 effectively block out any currents that may be induced in winding 28 by the switching of core 2 when the shifting pulse $SH_1$ is not present to pass current through the transfer loop. Consequently the transfer of information from core 2 to core 4 is conditioned upon the application of a shifting pulse $SH_1$ to core 2 via the transfer loop 31. Thus a transfer to core 4 is prevented should the core 2 be reset to its "0" state by a feedback pulse on lead 20.

Assume that core 2 is in its "1" state and a shifting pulse $SH_1$ is applied at the center tap 41 of the split input winding through lead 42. Then the shifting pulse $SH_1$ will cause current flow through two paths, the upper branch comprising the winding 38, resistor 34, diode 30, output winding 28 on core 2. The lower branch comprises the winding 40, resistor 36 and diode 32. Output lead 44 is the common output lead for the two branches. Since only the current in the upper branch of the conditional transfer circuit passes through winding 28, and that current passes through the dotted terminal of winding 28, core 2 switches to its "0" state. As soon as core 2 begins switching to its "0" state, in accordance with Lenz's law, a counter E.M.F. is induced in winding 28 so as to oppose such change. This counter E.M.F. creates a current flow in the direction of arrow 46 and such current flow will oppose and reduce the flow of current created by the shifting pulse $SH_1$ in the upper branch of the transfer loop but will not reduce the current flow created by the shifting pulse $SH_1$ in the lower branch. Thus as core 2 is switching to its "0" state as a consequence of the presence of a shifting pulse $SH_1$, more current will flow into the undotted terminal of winding 40 than will flow into the dotted terminal of winding 38 creating a differential current which will be sufficient to switch core 4 to its "1" state. Thus, the conditional transfer of a "1" from core 2 to core 4 is effectively consummated.

The conditional transfer circuit employed herein is not an invention of the present applicant but is described and claimed in a co-pending application filed by John O. Paivinen, Serial No. 396,603, on December 7, 1953 and assigned to the same assignee as applicant's assignee. It is to be understood that the overall combination disclosed herein is not to be limited to the specific conditional transfer circuit shown, but any conditional transfer circuit will do so as long as it permits transfer from core 2 to core 4 only when a shifting pulse initiates such transfer.

After the transfer of information from core 2 to core 4 has taken place as a consequence of the application of a shifting pulse $SH_1$ to terminal 41, a shifting pulse $SH_2$ is applied through winding 48 coupled to core 4 so as to switch said core 4 to its "0" state. When core 4 is switched from its "1" state to its "0" state, an output signal pulse causes current flow in winding 50, diode 52, another winding 54 in an output core of a shift register or the like, through the dotted terminal of winding 56 on core 2, and back to winding 50. The current through winding 56 resets core 2 to its "0" state. The output circuit 51 is one form which the electrical circuitry for output lead 18 and feedback lead 20 shown symbolically in Figure 3 may take. A dotted core 2' is shown coupled to winding 54 to suggest that the output signal pulse obtained from core 4 could be used to actuate the next stage in a magnetic shift register or logic-solving device. Obviously the output signal pulse could be used for many other purposes if desired, and the showing of another core as a load to be driven by such output signal pulse is not to be considered a limiting feature of the invention.

The resistors 34 and 36 may be utilized for equalizing current flow in the upper and lower branches of the conditional transfer loop when a shifting pulse $SH_1$ is applied to the conditional transfer loop. Such equalization may be necessary should the impedance characteristics of the diodes 30 and 32 differ, such differences serving to produce an undesirable current differential between the two branches.

Figure 4:
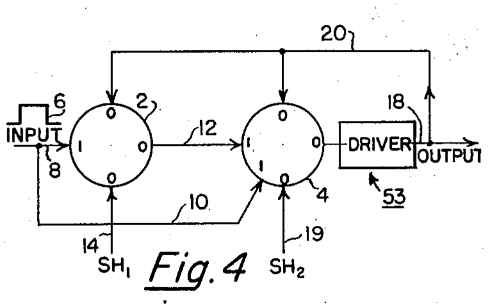
Figure 4 is a representation of Figure 2 in symbolic logic and block diagram notation.

Figure 4 is substantially the same circuit as that shown in Figure 3 save for two important features; one being the replacement of the conditional transfer circuit of Figure 3 with an unconditional transfer circuit, and the second being the addition of a triggered driving circuit 53 in the output lead 18, such driving circuit being shown in block form. The driving circuit 53 is an additional safeguard for assuring the proper operation of the invention shown in Figure 3. When an output signal pulse from core 4 is obtained, part of the energy is used in an output circuit and part of the energy is fed back to switch both cores 2 and 4 to their respective "0" states. Occasionally the output circuit may be highly loaded so that not enough energy is fed back to cores 2 and 4 to supply switching energy to such cores. To assure that such feedback of energy will take place, an auxiliary driver circuit 53 is supplied which provides enough energy to handle the maximum load to be expected in the output circuit as well as to switch cores 2 and 4 to their respective "0" states. Such auxiliary driver circuit is a normally nonconducting blocking oscillator circuit, but is triggered into action by an output signal pulse produced when core 4 switches.

Figure 2:
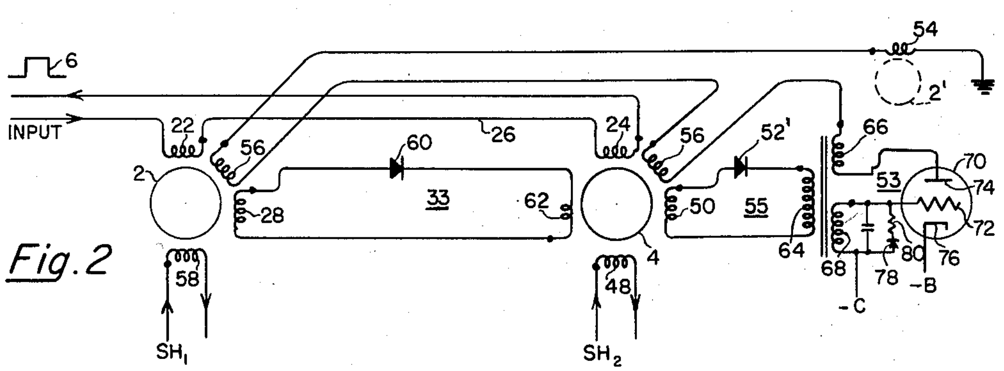
Figure 2 is a modification of the embodiment shown in Figure 1.

Figure 2 shows the electrical circuitry for the invention in modified form. The input pulses 6 are fed into cores 2 and 4 so as to prevent the nullification of information signals should such pulses arrive coincidentally with any of the shifting pulses $SH_1$ or $SH_2$ in the manner described in connection with Figure 1. It should be noted that when core 2 is switched to its "0" state by the application of a shifting pulse $SH_1$ to winding 58, an unconditional transfer of a "1" takes place through diode 60 and winding 62 coupled to core 4. Now when a shifting pulse $SH_2$ is applied through the dotted terminal of winding 48, core 4 switches to its "0" state and induces a current pulse in output winding 50.

The current pulse traverses diode 52' and winding 64 which is transformer-coupled to windings 66 and 68 of the blocking oscillator circuit. Triode 70 is biased to cut-off by the —C voltage that is applied to the grid 72 of tube 70 through winding 68. Winding 66 is coupled to the plate 74 of tube 70 and cathode 76 is connected to the —B terminal of the voltage supply to said tube 70 which has a grounded positive terminal. While core 4 is switching to its "0" state due to application of a $SH_2$ pulse to winding 48, the induced current pulse coursing through winding 64 induces a voltage pulse in winding 68 which overcomes the cut-off bias —C being applied to grid 72. Tube 70 fires, and once conduction of tube 70 begins, current flows into the dotted terminals of both windings 56 and 66. Such flow of current in windings 56 switches cores 2 and 4 to their "0" states. The flow of current into the dotted terminal of winding 66 also induces current flow out of the dotted terminal of winding 68 so as to further enhance the conduction of current through tube 70. This switching of core 4 to its "0" state continues the process of removing the cut-off bias from the grid 72 of tube 70 so that the latter continues conducting until core 4 has been completely switched to its "0" state. There are more ampere-turns in winding 56 than in winding 62 to override the possible transfer of a "1" from core 4 to core 2 via transfer loop 33. Once the "0" state is reached, no further positive voltage is induced in winding 68, the regenerative cycle stops, and cut-off bias is reapplied to the grid 72 of tube 70 via winding 68. The damping circuit including diode 78 and resistor 80 assists in the smooth operation of blocking oscillator 72.

The auxiliary driving circuit adds greater reliability to the operation of the invention by assuring that when core 4 switches to produce an output signal in output circuit 55, both core 2 and load 2' will switch, but not either core alone. Not only are signal pulses preserved even should they arrive coincidentally with shifting pulses $SH_1$ and $SH_2$, but such circuit assures the resetting of cores to their "0" states by feeding back, during a readout period, an amount of energy that is capable of assuring complete switching of cores to their "0" states. Because of the blocking oscillator circuit 53 and the fact that it maintains itself after triggering, both cores 4 and 2 may be reset at the same time, rendering unnecessary the need for the conditional transfer circuit of Figure 1.

Figures 1–4 of the drawings are intended as circuit schematics only, and are not intended to illustrate the constructions of the binary cores or transformer windings or the physical arrangements of the windings thereon. The proper polarities at the windings and the directions in which they should be wound will be apparent to those skilled in the art to which the invention pertains, and cannot be given for general application since they depend upon available current sources, core materials and core dimensions.

It is seen from the above description of the invention that there is provided an improved novel magnetic circuit that performs the function of preserving input signals being read into a magnetic shift register even when said signals occur simultaneously with a signal that would normally nullify or destroy such input signals. Moreover, even though input pulses to a core may occur at random times during a specified read-in period, the output from said core is standardized with respect to time and is synchronized with the operation of the remainder of the system.

What is claimed is:

1. A device for converting asynchronously timed data input pulses to synchronously timed output pulses, said device comprising: first and second magnetic cores each having input and output windings and each capable of assuming either of two stable states of magnetic remanence, one a set state and the other a reset state; a transfer circuit including a first-core output winding and a second-core input winding coupling said first and second cores for transferring information from said first to said second core in response to a shift pulse; a feedback circuit including a second-core output winding and a first-core input winding adapted to switch or to tend to switch said first core to said reset state in response to an output pulse from said second core; utilization means; means for applying a first shift pulse at time period $t_1$ to said transfer circuit to switch or to tend to switch said first core to said reset state; means for applying a second shift pulse at time period $t_2$ to said second core to switch or to tend to switch said second core to said reset state, said time periods occurring at different times and in the order $t_1$, $t_2$, $t'_1$, $t'_2$; means for applying each said asynchronously timed data input pulse simultaneously to both said first and second cores to switch or to tend to switch both said cores to said set state, both said cores assuming said set state unless said input pulse occurs in coincidence with either said first or second shift pulse in which case the flux established at one of said cores due to said data input pulse is opposed and overridden by that due to said coinciding shift pulse thereby inhibiting the switching of that one of said cores, whereby, if said input pulse is coincident with said first shift pulse at time $t_1$, said second core only is set by said input pulse, said second core thereafter being reset by said second shift pulse at time $t_2$ to develop, in response to said reset action, an output pulse at time $t_2$ for application to said utilization means, and whereby, if said input pulse is coincident with said second shift pulse at time $t_2$, said first core only is set by said input pulse, said first core thereafter being reset by said first shift pulse at time $t'_1$ to effect, through said transfer circuit and in response to said resetting of said first core, the switching of said second core to said set state, said second core thereafter being switched to said reset state by said second shift pulse at time $t'_2$ thereby to develop an output pulse at time $t'_2$ for application to said utilization means, said feedback circuit, in response to said output pulse, switching or tending to switch said first core to said reset state.

2. A device for converting asynchronously timed data input pulses to synchronously timed output pulses, said device comprising: first and second magnetic elements each having input and output means and each capable of assuming either of two stable states of magnetic remanence, one a set state and the other a reset state; a transfer circuit including first-element output means and second-element input means coupling said first and second element for transferring, in response to a shift pulse, information from said first to said second element; a feedback circuit including second-element output means and first-element input means adapted to switch or to tend to switch said first element to said reset state in response to an output pulse from said second element; means for applying a first shift pulse at time period $t_1$ to said first element to switch or to tend to switch said first element to said reset state; means for applying a second shift pulse at time period $t_2$ to said second element to switch or to tend to switch said second element to said reset state at time period $t_2$, said time periods occurring at different times in the order $t_1$, $t_2$, $t'_1$, $t'_2$; means for applying each said asynchronously timed data input pulse simultaneously to both said first and second elements to switch or to tend to switch both said elements to the set state, both said elements assuming said set state in the absence of coincidence between said input pulse and either said first or second shift pulse, whereby in the case of such coincidence the flux at one of said elements due to said input pulse is opposed and overridden by that due to said coinciding shift pulse thereby inhibiting the switching of that one of said elements, whereby, if said input pulse is coincident with said first shift pulse at time $t_1$, said second element only is set by said input pulse, said second element thereafter being reset by said second shift pulse at time $t_2$ to develop, in response to said reset action, an output pulse at time $t_2$ for application to utilization means, and whereby, if said input pulse is coincident with said second shift pulse at time $t_2$, said first element only is set by said input pulse, said first element thereafter being reset at time $t'_1$ by said first shift pulse to effect, through said transfer circuit and in response to said resetting of said first element, the switching of said second element to said set state, said second element thereafter being switched to said reset state by said second shift pulse at time $t'_2$ thereby to develop an output pulse at time $t'_2$ for application to said utilization means, said feedback circuit, in response to said output pulse, switching or tending to switch said first element to said reset state.

3. A device for converting asynchronously timed data input pulses to synchronously timed output pulses, said device comprising: first and second bistable elements each having input and output means and each capable of assuming either of two stable states, one a set state and the other a reset state; a transfer circuit including first element output means and second-element input means coupling said first and second elements for transferring, in response to a shift pulse, information from said first to said second element; a feedback circuit including second-element output means and first-element input means adapted to switch or to tend to switch said first element to said reset state in response to an output pulse from said second element; means for applying a first shift pulse at time period $t_1$ to said first element to switch or to tend to switch said first element to said reset state; means for applying a second shift pulse at time period $t_2$ to said second element to switch or to tend to switch said second element to said reset state at time period $t_2$, said time periods occurring at different times in the order $t_1$, $t_2$, $t'_1$, $t'_2$; means for applying each said asynchronously timed data input pulse simultaneously to both said first and second elements to switch or to tend to switch both said elements to the set state, both said elements assuming said set state in the absence of coincidence between said input pulse and either said first or second shift pulse, whereby in the case of such coincidence said input pulse is opposed and overridden by said coinciding shift pulse thereby inhibiting the switching of that one of said elements, whereby, if said input pulse is coincident with said first shift pulse at time $t_1$, said second element only is set by said input pulse, said second element thereafter being reset by said second shift pulse at time $t_2$ to develop, in response to said reset action, an output pulse at time $t_2$ for application to utilization means, and whereby, if said input pulse is coincident with said second shift pulse at time $t_2$, said first element only is set by said input pulse, said first element thereafter being reset at time $t'_1$ by said first shift pulse to effect, through said transfer circuit and in response to said resetting of said first element, the switching of said second element to said set state, said second element thereafter being switched to said reset state by said second shift pulse at time $t'_2$ thereby to develop an output pulse at time $t'_2$ for application to said utilization means, said feedback circuit, in response to said output pulse, switching or tending to switch said first element to said reset state.

4. A device for converting a synchronously timed data input pulses to synchronously timed output pulses, said device comprising: first and second elements each having input and output means and each capable of assuming either of two stable states, one a set state and the other a reset state; a transfer circuit coupling said first and second elements for transferring information from said first to said second element; a feedback circuit adapted to switch said first element to said reset state in response to an output pulse from said second element; means for applying a first shift pulse at time period $t_1$ to said first element to switch said first element to said reset state; means for applying a second shift pulse at time period $t_2$ to said second element to switch said second element to said reset state, said time periods occurring at different times in the order $t_1$, $t_2$; means for applying each said asynchronously timed data pulse simultaneously to both said first and second elements to switch or to tend to switch said elements to the set state, both said elements assuming said set state in the absence of coincidence between said applied data pulse and either said first or second shift pulse but in the case of such coincidence said applied data pulse being opposed and overridden by said coinciding shift pulse thereby inhibiting the switching of one of said elements, whereby the other element only assumes said set state; and means for developing an output pulse in response to a shift pulse at time $t_2$ for application to utilization means.

5. Apparatus as claimed in claim 4 characterized in that current driver means are coupled to said output-signal means and also to said feedback circuit for assuring the supply of adequate feedback current to effect resetting of said first element.

6. A device for converting asynchronously timed input signals to synchronously timed output signals, said device comprising: first and second elements each having input and output means and each capable of assuming either of two stable states, one a set state and the other a reset state; a transfer circuit coupling said first and second elements for transferring information from said first to said second element; a feedback circuit adapted to switch said first element to said reset state in response to an output signal from said second element; means for applying a first shift pulse at time period $t_1$ to said first element to switch said first element to said reset state; means for applying a second shift pulse at time period $t_2$ to said second element to switch said second element to said reset state, said time periods occurring at different times in the order $t_1$, $t_2$; means connectable to a source of data pulses which may be randomly spaced apart in time from one another for simultaneously applying each such data pulse to both said elements, each said applied data pulse being capable of switching said elements to the set state, both said elements assuming said set state unless there is coincidence between said applied data pulse and either said first or second shift pulse in which event said applied data pulse is opposed and overridden at one element by said coinciding shift pulse thereby inhibiting the switching of that one of said elements, whereby the other element only assumes said set state; and means for developing from said second element an output signal in response to a shift pulse at time $t_2$.

7. Apparatus as claimed in claim 2 characterized in that said means for applying a first shift pulse at time period $t_1$ to said first element includes said transfer circuit.

8. Apparatus as claimed in claim 3 characterized in that said means for applying a first shift pulse at time period $t_1$ to said first element includes said transfer circuit.

9. Apparatus as claimed in claim 4 characterized in that said means for applying a first shift pulse at time period $t_1$ to said first element includes said transfer circuit.

10. Apparatus as claimed in claim 6 characterized in that said means for applying a first shift pulse at time period $t_1$ to said first element includes said transfer circuit.

References Cited in the file of this patent

UNITED STATES PATENTS

| | | |
|---|---|---|
| 2,654,080 | Browne | Sept. 29, 1953 |
| 2,719,961 | Karnaugh | Oct. 4, 1955 |
| 2,719,962 | Karnaugh | Oct. 4, 1955 |
| 2,723,354 | Isborn | Nov. 8, 1955 |
| 2,741,758 | Cray | Apr. 10, 1956 |
| 2,769,925 | Saunders | Nov. 6, 1956 |

OTHER REFERENCES

"High Speed Shift Register Using Magnetic Binaries," (Fisherman), Paper 150, Winter General Meeting of the Institute of Radio Engineers, March 1952, pages 1–12 with 10 figures.